BURTON F. MILLER
INVENTOR.

United States Patent Office 3,310,744
Patented Mar. 21, 1967

3,310,744
RECEIVER FOR DETERMINING THE FREQUENCY OF AN INTERCEPTED SIGNAL
Burton F. Miller, Pacific Palisades, Calif., assignor, by mesne assignments, to TRW Inc., a corporation of Ohio
Filed May 12, 1958, Ser. No. 735,091
15 Claims. (Cl. 325—363)

The present invention relates in general to intercept receiver systems and more particulaly to a wide-band intercept receiver system that can determine with a relatively high degree of accuracy the frequency at which a signal source is operating within a selected frequency spectrum.

Electromagnetic radiating sources are customarily distributed in frequency throughout much of the useful portion of the spectrum and, furthermore, certain types of sources may be in operation for only brief intervals of time. Accordingly, it is desirable that equipment designed to intercept such radiations, such as aerial electronic reconnaissance apparatus, have the composite capability of continuously viewing much or all of that portion of the spectrum believed to be of interest and of determining with a reasonably high degree of accuracy the actual frequency at which a given source is operating. Individual receiver systems currently being employed for electronic reconnaissance work generally do not provide in any simple way this desirable combination of features, namely, of simultaneously viewing the frequency spectrum of interest and of providing a comparatively high order of definition of intercept signal frequency.

It is, therefore, an object of the present invention to provide an intercept receiver system having the composite capability of viewing an extended region of the frequency spectrum and simultaneously therewith indicating with a relatively high order of definition the frequencies of intercepted signals.

It is another object of the present invention to provide a receiver system that is capable of measuring the difference in frequency between a fixed reference frequency and that of a received signal.

It is a further object of the present invention to provide a receiver system that determines the unknown frequencies of intercepted signals by indicating the number of times it is necessary to increase the frequencies of these signals by equal increments before they attain a predetermined frequency.

The intercept receiver system of the present invention overcomes the above and other limitations encountered in earlier types of intercept receiver systems and this is done, according to the basic concept of the present invention, by measuring the time displacement between two output signals produced in response to a received signal of unknown frequency, the time interval between said two output signals being a direct measure of the difference in frequency between a fixed reference frequency and the unknown frequency, from which the unknown frequency can thereafter be easily ascertained.

More specifically, the frequency spectrum being observed is divided into a plurality of frequency subgroups of equal bandwidth, the narrowness of the bandwidth selected for the subgroups being dependent upon the accuracy with which the frequencies of intercepted signals are to be determined. The subgroup at one end of the spectrum, preferably the upper end, is used as a reference. When a signal of unknown frequency is intercepted, the signal frequency is successively increased, each increase being equal to the bandwidth of a subgroup, until the stepped-up signal frequency falls within the range of the reference subgroup. During each such frequency increase, the signal also experiences a fixed time delay. Thus, by measuring the total time delay, the number of subgroups between the reference subgroup and the original subgroup of the intercept signal is also ascertained. In this way, the frequency of the intercept signal can easily be determined with the desired accuracy.

In a preferred embodiment of the present invention, the signal of unknown frequency, when received, is ultimately applied both to an output terminal where it is recorded and to a known very narrow band-pass filter whose passband corresponds to the bandwidth of a frequency subgroup. If the frequency of the received signal lies within the filter passband, then the signal is passed to another output terminal for recordation. In this case, the recordations occur simultaneously. On the other hand, if the signal frequency is below the passband of the filter, the signal is rejected by the filter and instead is circulated in a closed loop wherein, in addition to being subjected to the aforementioned predetermined incremental increase in frequency, the signal is applied to a time delay network as a result of which the signal also experiences a predetermined time delay. Thereafter, the signal is again applied to the filter and if again rejected, the signal is once again circulated through the loop for another frequency increment and time delay.

The signal is successively stepped up in frequency and delayed in time until the increased signal frequency lies within the filter passband, at which time the signal is passed to the second output terminal where it is recorded. By measuring the total time delay between the recorded signals, one is also provided with a measure of the number of times the signal frequency has been increased. Consequently, a fairly accurate indication is obtained of the frequency difference between the filter passband and the received signal, thereby enabling one to obtain a reasonably accurate determination of the frequency at which the signal source is operating. Thus, the present invention provides a simple way, heretofore unavailable in the prior art, for receiving signals over an extended region of the frequency spectrum and of measuring with reasonable accuracy the particular unknown frequencies of the received signals.

The novel features which are believed to be characteristic of the invention, both as to its organization and method of operation, together with further objects and advantages thereof, will be better understood from the following description considered in connection with the accompanying drawings in which an embodiment of the invention is illustrated by way of example.

Figure 1:
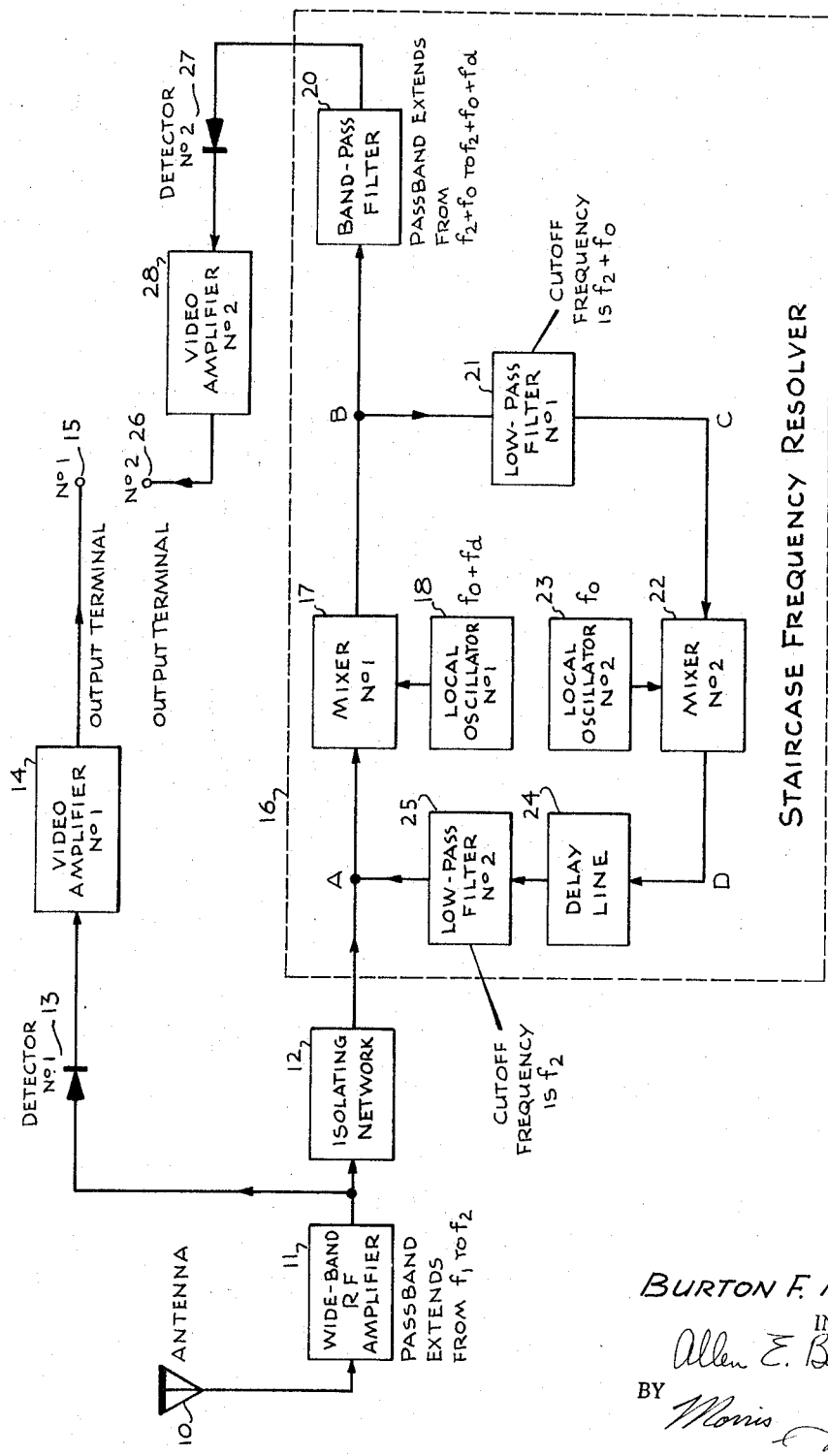
FIG. 1 shows a block diagram of one embodiment of the present invention.

Referring now to the accompanying drawings, there is shown in FIG. 1 an antenna 10 connected to a wide-band radio-frequency amplifier 11 whose selected passband extends from a lower frequency $f_1$ to an upper frequency $f_2$. The output of amplifier 11 is connected to both an isolating network 12, such as a cathode follower circuit, and a detector, such as a crystal diode, which is generally indicated as 13. A video amplifier 14 is connected between detector 13 and a first output terminal 15 which may be connected to a magnetic-tape recorder, a photographic recorder, or to any other suitable signal storage device. It will be recognized that if wide-band amplifier 11 is characterized by inherently high sensitivity and low noise level, the combination of antenna 10, wide-band amplifier 11, detector 13 and video amplifier 14 constitutes a relatively high sensitivity, wide-band intercept receiver system which is, as yet, incapable of yielding information concerning the frequency of intercepted signals to any greater degree of accuracy than is provided by the known passband of the wide-band amplifier.

Isolating network 12 is connected to what may be termed a staircase-frequency-resolver network. The resolver network is set off in the figure by the dashed lines and is generally designated 16. Resolver network 16 includes first mixer circuit 17 having a first input terminal connected to isolating network 12 and a second input terminal connected to a first local oscillator 18 which continuously applies a signal to mixer 17 at a fixed frequency $(f_o+f_d)$. The value and meaning of frequencies $f_o$ and $f_d$ will be more fully understood from the explanation to follow. The output of mixer 17 is connected both to a band-pass filter 20 and to a first low-pass filter 21, the passband of filter 20 extending from lower frequency $(f_2+f_o)$ to upper frequency $(f_2+f_o+f_d)$ and the cut-off frequency of filter 21 being $(f_2+f_o)$.

The resolver network further includes a second mixer circuit 22 whose first input terminal is connected to low-pass filter 21 and whose second input terminal is connected to a second local oscillator 23 which continuously applies a signal to the second mixer at a frequency of $f_o$. The output of mixer 22 is connected to a delay line network 24 which provides a fixed time delay T for signals applied to it. To complete the resolver network, a second low-pass filter 25 is connected between delay line 24 and the first input terminal of first mixer circuit 17, the cut-off frequency of filter 25 being $f_2$.

The output of resolver network 16, which is the same as the output terminal of band-pass filter 20, is connected to another detector-video amplifier combination connected in series between filter 20 and a second output terminal 26. More specifically, band-pass filter 20 is connected to a second detector generally designated 27, the second video amplifier, designated 28, being connected between detector 27 and second output terminal 26. Output terminal 26 is also connected to any recording mechanism to which output terminal 15 may be connected.

In considering the operation, it will be assumed that wide-band amplifier 11 freely transmits all signals applied to it falling between its lower frequency limit $f_1$ and its upper frequency limit $f_2$ and that it sharply attenuates all other signals falling outside this transmission band or selected frequency spectrum. Let it additionally be assumed that knowledge of the frequency of any intercepted signal within an amount $f_d$ is desired. It should then be apparent that the desired definition will have been attained if it is possible to determine within which of the $$\frac{(f_2-f_1)}{f_d}$$

frequency subgroups, contained within the $(f_2-f_1)$ passband, the frequency of the intercepted signal falls.

When a signal of unknown frequency $f_x$ that falls within the $f_1$ to $f_2$ passband is intercepted by antenna 10, the signal is applied to wide-band amplifier 11 wherein it is suitably amplified. The signal is thereafter applied in succession to detector 13 and video amplifier 14, the output signal from the video amplifier appearing at output terminal 15 where it is preferably recorded in the first of two channels of the recording device utilized.

The intercepted signal, after being amplified by wide-band amplifier 11, is also applied to isolating network 12 which passes the signal to mixer circuit 17 in staircase-frequency-resolver network 16. Mixer 17 heterodynes the output signal from isolating network 12, which signal is still at unknown frequency $f_x$, against the signal generated at frequency $(f_o+f_d)$ by local oscillator 18, with the result that the frequency of the output signal produced by mixer 17 is $(f_x+f_o+f_d)$. With respect to the heterodyning process that takes place in mixer 17, it should be mentioned that the heterodyning of two signals at different frequencies results in the production of two output signals whose frequencies, respectively, are equal to the sum and difference of the two original frequencies. Thus, in the present instance, the frequencies of the two output signals produced by mixer 17 are respectively $(f_x+f_o+f_d)$ and $(f_o+f_d-f_x)$. These two frequencies are generally sufficiently far apart on the frequency spectrum so that, by properly tuning the mixer elements, one or the other of them may be rejected and the remaining one passed on to the next stage. In the circuit of FIG. 1, mixer 17 has been tuned to pass only that signal whose frequency is $(f_x+f_o+f_d)$, as already stated above. The output of mixer 17 is then applied to band-pass filter 20 whose transmission band, as heretofore mentioned, extends from a lower frequency limit $(f_2+f_o)$ to an upper frequency limit $(f_2+f_o+f_d)$. It will be recognized, therefore, that if frequency $f_x$ of the signal intercepted by antenna 10 falls within the frequency subgroup extending from $(f_2-f_d)$ to $f_2$, then frequency $(f_x+f_o+f_d)$ of the signal produced by mixer 17 falls within the passband limits of filter 20, namely, $(f_2+f_o)$ to $(f_2+f_o+f_d)$. The mixer output signal is, consequently, transmitted to detector 27 and video amplifier 28, the output signal from amplifier 28 appearing at output terminal 26 simultaneously with the appearance of the corresponding signal at output terminal 15.

However, in the event that the frequency $f_x$ of the intercepted signal is in a subgroup below that of the subgroup extending from $(f_2-f_d)$ to $f_2$, then the frequency $(f_x+f_o+f_d)$ of the mixer 17 output signal is also below the passband of filter 20. Consequently, the mixer 17 output signal is rejected by filter 20 and passed instead through low-pass filter 21 since the cut-off frequency $(f_2+f_o)$ of filter 21 is set equal to the lower cut-off frequency of filter 20.

By way of example, let it be assumed that instead of the unknown frequency $f_x$ of the intercepted signal falling within the above-discussed subgroup having frequency limits $(f_2-f_d)$ and $f_2$, it falls within the next preceding subgroup whose frequency limits are $(f_2-2f_d)$ and $(f_2-f_d)$. Consequently, after experiencing a frequency translation $(f_o+f_d)$ in mixer 17, the frequency $(f_x+f_o+f_d)$ of the mixer output signal falls between the limits $(f_2+f_o-f_d)$ and $(f_2+f_o)$ which, it is seen, is below the $(f_2+f_o)$ to $(f_2+f_o+f_d)$ range of filter 20. Thus, the frequency of the mixer 17 output signal in this case falls within the range of filter 21.

After traversing filter 21, the signal is applied to mixer circuit 22 wherein the signal is heterodyned against the signal generated by local oscillator 23 at frequency $f_o$ and, by virtue of the combination with the latter signal, the intercepted signal previously translated upward in frequency by an amount $(f_o+f_d)$ is now translated downward in frequency by an amount $f_o$. The downward translation in frequency occurs for the reasons previously given in connection with the operation of mixer 17, namely, mixer 22 is tuned to the lower one of the output frequencies. It is easily seen, therefore, that the combined or ultimate effect of upward frequency translation by an amount $(f_o+f_d)$ in mixer 17 and downward frequency translation by an amount $f_o$ in mixer 22 is equivalent to adding an increment in frequency equal to $f_d$ to the original signal frequency $f_x$. The output signal from mixer 22, which signal is at a frequency $(f_x+f_d)$, is next applied to delay line 24 which delays the signal applied thereto by an interval of time equal to T. The delayed signal is then applied to low-pass filter 25 whose cut-off frequency, as previously mentioned, is set equal to $f_2$. Accordingly, the signal out of delay line 24 is passed by filter 25 and re-applied to the input circuit of mixer 17.

From what has been described thus far, it will be apparent that signal transmission around the loop ABCDA results in a stepwise frequency translation of the original signal by an amount $f_d$ and the application of a time delay equal to T to the signal before it is re-applied to point A in the network. Isolating network 12 prevents any backward transmission of the delay signal to detector 13.

The translated and delayed signal appearing at point A in the network is again transmitted through mixer 17 where it again experiences the frequency translation previously described. If the signal now produced at the output of mixer 17 falls within the passband of band-pass filter 20, it is blocked by low-pass filter 21 from being re-applied to mixer 22 but is permitted to pass to detector 27 so that, after passing through amplifier 28, the desired signal signal is developed at output terminal 26. On the other hand, if the once circulated signal appearing at the output of mixer 17 still falls below the passband of filter 20, it is again transmitted around the loop ABCDA. During its second traversal of this loop, the signal experiences a second increment in frequency equal to $f_d$ and a second time delay equal to T following which it is once more applied to the input of mixer 17.

The process of signal circulation around loop ABCDA continues until the original signal has experienced a total upward translation of frequency sufficient to cause the ultimate frequency of the translated signal to fall within the passband of band-pass filter 20. The maximum number of loop traversals which any signal can make, it will be recognized, is equal to $$\frac{(f_2-f_1)}{f_d}-1$$

following which the signal frequency must have been increased to a value sufficient to permit its transmission through the filter and, when this occurs, the signal is produced at output terminal 26, as previously explained.

Furthermore, since the signal experiences the same incremental frequency translation during each traversal of the loop, knowledge of the number of loop traversals required before the signal is passed to output terminal 26 is sufficient to indicate the total frequency translation experienced by the intercepted signal. The information with respect to the number of loop traversals is obtained by determining the total time delay between the signals at output terminals 15 and 26. This total time delay, when divided by the individual time delay T provided by delay line 24 indicates the number of loop traversals experienced by the signal. Of course, once the number of loop traversals is known, the difference between the unknown frequency $f_x$ of the intercepted signal and the center frequency of the very narrow band-pass region of filter 20 can be obtained by multiplying the number of loop traversals with the quantity $f_d$. The unknown frequency can then be determined with reasonable accuracy by merely subtracting the difference frequency thus obtained from the center frequency of the band-pass region of filter 20.

It will be apparent that the choice of an upward frequency translation in one of the mixers, namely, mixer 17, and a downward frequency translation in the other, namely, mixer 22, is purely arbitrary. Whether mixer 17 translates a signal upward or downward in frequency will be determined in part by wide-band amplifier 11 and in part by considerations relating to mixer performance. It should be mentioned, however, that if mixer 17 reduces the frequency of signals applied thereto by $(f_o+f_d)$ cycles and mixer 22 increases the frequency of signals applied thereto by $f_o$ cycles, then the passband of bandpass filter 20 should extend from a lower frequency $(f_1-f_o-f_d)$ to an upper frequency $(f_1-f_o)$, filter 21 should be a high-pass filter having a cut-off frequency $(f_1-f_o)$, and filter 25 should also be a high-pass filter having a cut-off frequency $f_1$.

In the event that more than one signal is received simultaneously in wide-band amplifier 11, it becomes necessary to provide some means for identifying associated signal pairs appearing at output terminals 15 and 26. The simplest means for achieving such identification is that of adjusting the gain between the input to isolating network 12 and the output of band-pass filter 20 to be equal to unity and, if the loop gain around the path ABCDA is also made equal to unity, associated signals appearing at output terminals 15 and 26 will be of precisely the same amplitude if the net gain from the input of detector 13 to the output of video amplifier 14 is equal to the net gain from the input of detector 27 to the output of video amplifier 28. Equivalence of signal amplitudes may then be employed to identify related signal pairs.

It should be noted that through a peculiarity of circuit behavior, the signal-to-noise ratio at the output of staircase-frequency-resolver-network 16 approximates that existing at the input to detector 13. Furthermore, it should be noted that the resolver network is suited to the analysis of continuous-wave signals as well as pulsed signals and that the receiver system of the present invention is capable of continuously receiving all signals whose frequencies lie between $f_1$ and $f_2$ and of providing identifications of the frequency of each signal with a maximum error equal to $f_d$. It will be obvious to those skilled in the art that by making $f_d$ small, the error incurred in determining the frequency of an intercepted signal can be made to have inconsequential importance.

Figure 2:
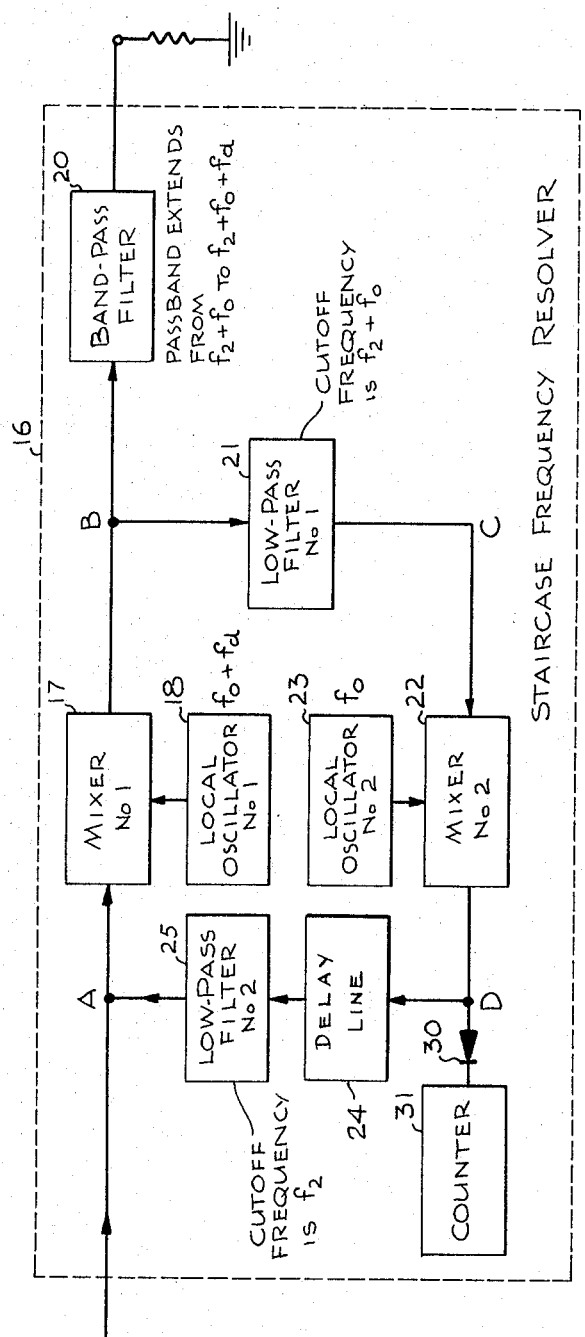
FIG. 2 shows a block diagram of the embodiment of FIG. 1 as modified.

Finally, it should be mentioned that the preferred embodiment described above may be modified in one or more respects without departing from the spirit or scope of the present invention. Thus, where electronic reconnaissance is not involved as where, for example, only a single signal is being examined for frequency determination, a detector circuit and counter device combination may be inserted in staircase-frequency-resolver network 16, between mixer 22 and delay line 24 for example, which counter device would provide a numerical indication of the number of frequency subgroups traversed. As a matter of fact, a counter device would eliminate the need for detector circuits 13 and 27, video amplifiers 14 and 28, and output terminal 15 although these elements could be retained to provide other information. Where, however, a counter device is substituted for these circuit elements, it is then only necessary to terminate the system at output terminal 26 with some lossy material to dissipate the signal power passed by band-pass filter 20. The embodiment as modified in the manner described is shown in FIG. 2, the detector and counter being designated 30 and 31, respectively. A counter device that may be adapted for use as counter 31 in the present invention is shown and described in the patent to E. B. Hansell entitled "Electromechanical Controlling and Counting System," Patent No. 2,672,067, issued Mar. 16, 1954.

Having thus described the invention, what is claimed as new is:

1. A receiver system for determining the frequency of an intercepted signal, said system comprising: first means for determining whether the frequency of the intercepted signal lies within a predetermined narrow band of frequencies; and a single closed loop receptive of the intercepted signal at one point therein and coupled to said first means at another point therein for applying the intercepted signal thereto, said loop including second means for successively translating the frequency of the intercepted signal by equal increments until the frequency lies within said predetermined narrow band, the number of frequency translations corresponding to the difference between the frequency of the intercepted signal and the center frequency of said predetermined narrow band.

2. A receiver system for determining the frequency of an intercepted signal, said system comprising: first means for determining whether the frequency of the intercepted signal lies within a predetermined narrow band of frequencies; a single closed loop receptive of the intercepted signal at one point therein and coupled to said first means at another point therein for applying the intercepted signal thereto, said loop including second means for successively translating the frequency of the intercepted signal by equal increments until the translated frequency lies within said predetermined narrow band, and third means for delaying the intercepted signal during each translation thereof by a predetermined interval of time, the total time delay between the original and finally translated intercepted signals corresponding to the difference between the frequency of the originally intercepted signal and the center frequency of said predetermined narrow band, whereby the frequency of the intercepted signal may be determined.

3. A receiver system for determining the frequency of an intercepted signal, said system comprising: input means responsive to the intercepted signal for producing a first output signal; first means for determining whether the frequency of the intercepted signal lies within a predetermined narrow band of frequencies; a single closed loop coupled at one point therein to said input means for receiving the intercepted signal therefrom and coupled at another point therein to said first means for applying the intercepted signal thereto, said loop including second means for successively translating the frequency of the intercepted signal by equal increments until the translated frequency lies within said predetermined narrow band, said second means including a device for delaying the intercepted signal during each translation thereof by a predetermined interval of time; and output means coupled to said first means and operable to produce a second output signal when the frequency of the intercepted signal lies within the predetermined frequency band of said first means, the time delay between said first and second output signals corresponding to the difference between the frequency of the intercepted signal and the center frequency of said predetermined narrow band, whereby the frequency of the intercepted signal may be determined.

4. A system for determining the unknown frequency $f_x$ of a signal received within a predetermined frequency spectrum extending from frequency $f_1$ to frequency $f_2$, said system comprising: first means for determining whether frequency $f_x$ lies within a predetermined narrow band of frequencies extending from $(f_2-f_d)$ to $f_2$, where $f_d$ is the bandwidth; and a single closed loop coupled receptive of the intercepted signal at one point therein and coupled to said first means at another point therein, said loop including second means for alternately translating the frequency of the received signal by $f_d$ cycles and comparing the translated frequency with said predetermined band of frequencies, said second means successively translating the frequency of the received signal $$\frac{f_2-f_x}{f_d}-1$$

times until the translated frequency lies within said predetermined band of frequencies, the number $$\frac{f_2-f_x}{f_d}-1$$

providing a substantially accurate measure of frequency $f_x$.

5. An intercept receiver system comprising: input means for receiving signals whose frequencies are within a predetermined frequency spectrum; first output means coupled to said input means and operable in response to a signal received by said input means to produce a first output signal coincident in time with said received signal; means for passing a received signal only when the frequency of said signal lies within a predetermined narrow band of frequencies having a bandwidth $f_d$; a single network loop for alternately applying a received signal to said means and translating the frequency of said received signal by $f_d$ cycles until said signal is passed by said means, said network including delay means for delaying said signal during each frequency translation thereof by a predetermined interval of time; and second output means coupled to said means and operable in response to a signal passed by said means to produce a second output signal coincident in time with said passed signal, the time delay between said first and second output signals being proportional to the difference between the frequency of the received signal and the center frequency of said predetermined narrow band of frequencies of bandwidth $f_d$.

6. An intercept receiver system comprising: input means for receiving signals whose frequencies are within a predetermined frequency spectrum extending from a lower frequency $f_1$ to an upper frequency $f_2$, said spectrum being divisible into $$\frac{(f_2-f_1)}{f_d}$$

frequency subgroups, where $f_d$ is the bandwidth of each subgroup; a filter having a passband extending from frequency $(f_2-f_d)$ to frequency $f_2$; and a single network loop coupled between said input means and said filter, said loop including means for alternately applying a received signal to said filter and translating the frequency of said received signal from one subgroup to the next higher subgroup until said received signal is passed by said filter, the number of translations corresponding to the difference between the frequency of a received signal and the center frequency $$\frac{(f_2-f_d)}{2}$$

of said filter passband.

7. An intercept receiver system comprising: an antenna; means for freely transmitting all signals received by said antenna whose frequencies fall between a lower frequency limit $f_1$ and an upper frequency limit $f_2$ and for sharply attenuating all signals whose frequencies fall outside said $f_1$ to $f_2$ transmission band; a first detector circuit for detecting signals transmitted by said means to produce a first output signal; an isolating circuit for passing signals transmitted by means and for substantially preventing signals in other parts of the receiver system from being fed back to said means and first detector circuit; a filter having a passband extending from one end of the $f_1$ to $f_2$ transmission band; a network for alternately applying a signal passed by said isolating circuit to said filter and translating the frequency of said passed signal by equal increments until said passed signal is also passed by said filter, said network including a device for delaying said signal during each translation thereof by a predetermined interval of time; and a second detector circuit for detecting signals passed by said filter to produce a second output signal, the time delay between said first and second output signals corresponding to the difference between the frequency of the signal intercepted by said antenna and the frequency of said one end of the $f_1$ to $f_2$ transmission band, whereby the frequency of the intercepted signal may be determined.

8. The receiver system defined in claim 7 wherein said means includes a wide-band amplifier having a passband extending from lower frequency $f_1$ to upper frequency $f_2$.

9. The receiver system defined in claim 7 wherein said first and second detector circuits include first and second rectifier elements and first and second video amplifiers, respectively, each video amplifier being connected in series to the associated rectifier element.

10. The receiver system defined in claim 8 wherein said first and second detector circuits include first and second rectifier elements and first and second video amplifiers, respectively, each video amplifier being connected in series to the associated rectifier element.

11. A system for determining the unknown frequency of a signal received within a predetermined frequency spectrum extending from lower frequency $f_1$ to upper frequency $f_2$, said system comprising: a first detector circuit for detecting the received signal to produce a first output signal; a first oscillator generating a signal at a frequency $(f_o+f_d)$; a first mixer circuit for heterodyning signals applied thereto against said first oscillator signal to increase the frequencies of said applied signals by $(f_o+f_d)$ cycles, the received signal of unknown frequency being applied to said first mixer; low-pass and band-pass filters connected to receive signals of increased frequency produced by said first mixer, the passband of said bandpass filter extending from a lower frequency $(f_2+f_o)$ to an upper frequency $(f_2+f_o+f_d)$ and the cut-off frequency of said low-pass filter being $(f_2+f_d)$; a second oscillator generating a signal at a frequency $f_o$; a second mixer circuit for heterodyning signals passed by said first low-pass filter against said second oscillator signal to reduce the frequencies of said passed signals by $f_o$ cycles; a delay line for delaying signals out of said second mixer by a predetermined interval of time; a second low-pass filter whose cut-off frequency is $f_2$, said second low-pass filter being connected to pass said delayed signals to said first mixer; and a second detector circuit for detecting a signal passed by said band-pass filter to produce a second output signal, the time delay between the first and second output signals produced in response to the received signal corresponding to the difference between the unknown frequency of the recived signal and frequency $f_2$.

12. A system for determining the unknown frequency of a signal received within a predetermined frequency spectrum extending from lower frequency $f_1$ to upper frequency $f_2$, said system comprising: a first detector circuit for detecting the received signal to produce a first output signal; a first oscillator generating a signal at a frequency $(f_o+f_d)$; a first mixer circuit for heterodyning signals applied thereto against said first oscillator signal to decrease the frequencies of said applied signals by $(f_o+f_d)$ cycles, the received signal of unknown frequency being applied to said first mixer; high-pass and band-pass filters connected to receive signals of decreased frequency produced by said first mixer, the passband of said band-pass filter extending from a lower frequency $(f_1-f_o-f_d)$ to an upper frequency $(f_1-f_o)$ and the cut-off frequency of said high-pass filter being $(f_1-f_o)$; a second oscillator generating a signal at a frequency $f_o$; a second mixer circuit for heterodyning signals passed by said first high-pass filter against said second oscillator signal to increase the frequencies of said passed signals by $f_o$ cycles; a delay line for delaying signals out of said second mixer by a predetermined interval of time; a second high-pass filter whose cut-off frequency is $f_1$, said second high-pass filter being connected to pass said delayed signals to said first mixer; and a second detector circuit for detecting a signal passed by said band-pass filter to produce a second output signal, the time delay between the first and second output signals produced in response to the received signal corresponding to the difference between the unknown frequency of the received signal and the frequency $f_1$.

13. A receiver system for determining the frequency of an intercepted signal, said system comprising: first means for determining whether the frequency of the intercepted signal lies within a predetermined narrow band of frequencies; second means for successively translating the frequency of the intercepted signal by equal increments until the translated frequency lies within said predetermined narrow band; and third means for counting the number of frequency translations, the number of frequency translations corresponding to the difference between the frequency of the intercepted signal and the center frequency of said predetermined narrow band, whereby the frequency of the intercepted signal may be determined.

14. An intercept receiver system comprising: means for freely transmitting signals received within a predetermined frequency spectrum extending from a lower frequency limit $f_1$ to an upper frequency limit $f_2$ and for sharply attenuating signals whose frequencies fall outside said $f_1$ to $f_2$ transmission band; a filter having a passband extending from one end of the $f_1$ to $f_2$ transmission band; a network for alternately applying a signal transmitted by said means to said filter and translating the frequency of said transmitted signal by equal increments until said signal is passed by said filter, said network including a device for registering each frequency translation, the total number registered being a measure of the difference between the frequency of a received signal and the frequency of said one end of the $f_1$ to $f_2$ transmission band, whereby the frequency of the received signal may be determined.

15. A system for determining the unknown frequency of a signal received within a predetermined frequency spectrum extending from lower frequency $f_1$ to upper frequency $f_2$, said system comprising: a first oscillator generating a signal at a frequency $(f_o+f_d)$; a first mixer circuit for heterodyning signals applied thereto against said first oscillator signal to increase the frequencies of said applied signals by $(f_o+f_d)$ cycles, the received signal of unknown frequency being applied to said first mixer; low-pass and band-pass filters connected to receive signals of increased frequency produced by said first mixer, the passband of said band-pass filter extending from a lower frequency $(f_2+f_o)$ to an upper frequency $(f_2+f_o+f_d)$ and the cut-off frequency of said low-pass filter being $(f_2+f_d)$; a second oscillator generating a signal at a frequency $f_o$; a second mixer circuit for heterodyning signals passed by said first low-pass filter against said second oscillator signal to reduce the frequencies of said passed signals by $f_o$ cycles; a second low-pass filter whose cut-off frequency is $f_2$, said second low-pass filter being connected to pass said signals of reduced frequency produced by said second mixer to said first mixer; and a counter device for registering the number of times the received signal is passed through the first low-pass filter for frequency translation, the total number registered corresponding to the difference between the unknown frequency of the received signal and frequency $f_2$.

References Cited by the Examiner

UNITED STATES PATENTS

| | | | |
|---|---|---|---|
| 2,159,790 | 5/1939 | Freystedt et al. | 250—20.41 |
| 2,465,355 | 3/1949 | Cook | 250—20.41 |
| 2,476,445 | 7/1949 | Lacy | 250—20.41 |
| 2,770,722 | 11/1956 | Arams | 330—107 X |
| 2,806,997 | 9/1957 | Carbery | 332—11 |
| 2,820,898 | 1/1958 | Familier et al. | 331—44 |
| 2,997,650 | 8/1961 | Applebaum | 324—79 |

KATHLEEN H. CLAFFY, *Primary Examiner.*

FREDERICK M. STRADER, CHESTER L. JUSTUS,
*Examiners.*

A. SODDI, G. M. FISHER, R. S. BELL,
*Assistant Examiners.*